United States Patent
Kikuchi et al.

(10) Patent No.: US 6,951,027 B2
(45) Date of Patent: Sep. 27, 2005

(54) OPTICAL INFORMATION MEDIUM

(75) Inventors: Shuichi Kikuchi, Miyagi (JP); Rie Izu, Miyagi (JP); Mariko Takiue, Komae (JP)

(73) Assignees: Sony Corporation, Tokyo (JP); Teikoku Printing Inks Mfg. Co., Ltd., Tokyo (JP)

( * ) Notice: Subject to any disclaimer, the term of this patent is extended or adjusted under 35 U.S.C. 154(b) by 102 days.

(21) Appl. No.: 10/262,099

(22) Filed: Sep. 30, 2002

(65) Prior Publication Data
US 2003/0067864 A1 Apr. 10, 2003

(30) Foreign Application Priority Data
Oct. 3, 2001 (JP) ......................................... 2001-307999

(51) Int. Cl.[7] ................................................. G11B 7/24
(52) U.S. Cl. ..................................................... 720/718
(58) Field of Search ......................... 720/718; 369/283, 369/286, 288; 428/64.4, 64.7, 64.8, 64.9, 65.1

(56) References Cited

U.S. PATENT DOCUMENTS

| | | | |
|---|---|---|---|
| 4,233,195 A | * 11/1980 | Mills | |
| 6,284,819 B1 | * 9/2001 | Darsillo et al. | 524/22 |
| 6,577,588 B1 | * 6/2003 | Tachikawa et al. | 369/275.1 |
| 6,613,264 B1 | * 9/2003 | Numrich et al. | 264/319 |
| 2002/0001285 A1 | * 1/2002 | Takeshima et al. | 369/290 |
| 2003/0222965 A1 | * 12/2003 | Field | 347/225 |

FOREIGN PATENT DOCUMENTS

| | | | |
|---|---|---|---|
| EP | 0 709 221 | * | 5/1996 |
| EP | 0 711 672 | * | 5/1996 |
| EP | 0 991 063 | * | 4/2000 |
| EP | 1 008 457 | * | 6/2000 |
| EP | 1 039 456 | * | 9/2000 |
| JP | 5-25416 | * | 2/1993 |
| JP | 7-169100 | * | 7/1995 |
| JP | 9-296141 | * | 11/1997 |
| JP | 9-320242 | * | 12/1997 |
| JP | 2972114 | | 8/1999 |
| JP | 2000-57635 | * | 2/2000 |
| JP | 3059377 | | 4/2000 |
| JP | 03 151606 | * | 4/2001 |
| JP | 2001-152069 | * | 6/2001 |
| JP | 2002-133722 | * | 5/2002 |
| JP | 2002-150615 | | 5/2002 |
| JP | 2002-200837 | | 7/2002 |
| JP | 2002-237103 | | 8/2002 |
| WO | WO- 98/38634 | * | 9/1998 |

OTHER PUBLICATIONS

Translation of JP 2002–237103, published Aug. 23, 2002.*

* cited by examiner

Primary Examiner—Angel Castro
(74) Attorney, Agent, or Firm—Jordan and Hamburg LLP

(57) ABSTRACT

An optical information medium having an ink-accepting layer that may secure a high-gloss printed surface similar to print image quality of print image on photographic paper is provided. The optical disk 1 is constituted by sequentially laminating concavo-convex information pits 3, a recording layer 4, a reflective layer 5, a protective layer 6, a second printing layer 7, and an ink-accepting layer 8 on a transparent substrate 2 made of synthetic resin such as polycarbonate. In the formation of the ink-accepting layer 8, the following proportions of the following constituents in percent by weight are milled to prepare an ink for printing: 5 to 15% urethane acrylate; 70 to 80% water-soluble monomer; 5 to 15% water-soluble monomer soluble resin; 5 to 15% photopolymerization initiator; 5 to 15% dyestuff fixing agent; and <5% silica.

9 Claims, 3 Drawing Sheets

OPTICAL INFORMATION MEDIUM

BACKGROUND OF THE INVENTION

The present invention relates to optical recording medium having a printed layer printed with ink which can be written on.

In some recording media, in which playback or recording is done by laser light, for example, a CD-R (Compact Disc Recordable) having a recording layer in which rewriting of one time or multiple times by a user is possible, an entry area in which so-called personal information, such as titles of records, date of record, etc. can be filled in by the user with characters, symbols, etc. and is provided on a side opposite to an incident side of laser light of the recording medium. In this entry area methods of entry by handwriting with a felt pen, by ink jet recording, so-called jet printing, or by transferring of colored ink by heat and pressure applied to a film having a colored ink layer may be applicable.

It has been proposed to provide a personal information entry area constituted by an ink-accepting layer prepared so that entry of personal information etc. by the above described felt pen or jet printer, transferring of colored ink by film having a colored ink layer, etc. may be sufficiently enabled.

In recent years, use of multiple ink nozzles makes multi-color recording having higher definition easier, and especially multi-color ink jet recording by various kinds of ink jet recording systems were carried out. In recent years printers used for ink jet recording have become to have high performance, and quality improvement of ink-accepting layer of the above described area for entry of personal information has become to be required. Namely, bleeding stability of printed image, and securing of a high-gloss printed surface, similar to print image quality of a print image on photographic paper, resulting from smoothness of a printed surface have been demanded.

However, conventionally, in plenty of cases, ink for ink jet recordings for recording on this ink-accepting layer has a constitution in which polyhydric alcohol etc. is added to water ink mainly including water as a principal component in order to avoid clogging of a nozzle, and to improve ejecting characteristics, for safety and record characteristics. Therefore, for the purpose of eliminating stickiness for strong adhesion of dyestuff in the ink, for quick absorption of water in the ink, and for improvement in handling property, an ink-accepting layer currently formed in an optical recording media, such as CD-R, includes a large amount of commonly known fillers, such as silica, talc, clay, zeolite, calcium carbonate, calcium silicate, magnesium carbonate, barium sulfate, mica, synthetic mica, diatomaceous earth, aluminum hydroxide, titanium oxide, powder cellulose, and powder protein. Therefore, a front face of the ink-accepting layer tends to be rough, and an ink-accepting layer in which a high-gloss printed surface similar to print image quality of a print image on photographic paper has not yet been realized.

The present invention is made in view of such a conventional actual situation, and aims at providing an optical information medium provided with an ink-accepting layer in which a high-gloss printed surface similar to a print image quality of print image on photographic paper is secured.

SUMMARY OF THE INVENTION

In order to solve the above described subject, in an information recording medium having an ink-accepting layer on which printing or writing is enabled on front face of the present invention, glossiness of a front face of the above described accepting layer represented with a value measured under 60-degree glossiness value conditions in an optical characteristic test method of plastics in JIS-K 7105 is set so that it might give not less than 40 degrees.

Since the above described surface glossiness was set as not less than 40 degrees, better visual glossiness is secured as compared with conventional ink-accepting layers.

DETAILED DESCRIPTION OF THE PREFERRED EMBODIMENTS

Figure 1:
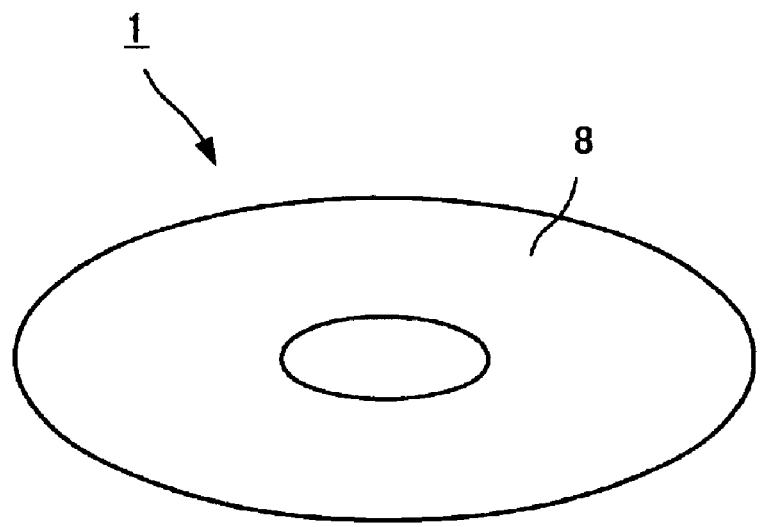
FIG. 1 is a perspective view showing an optical disk according to a first embodiment of the present invention.
Figure 2:
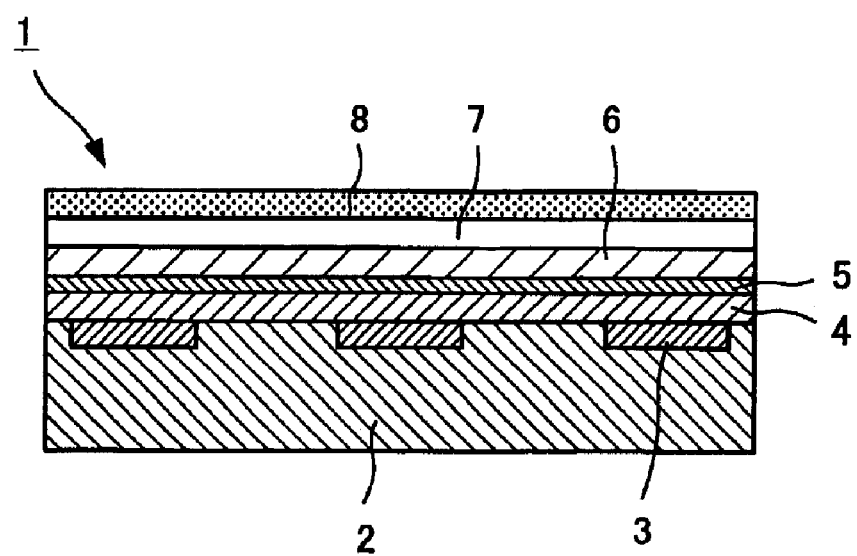
FIG. 2 is an expanded sectional view of the optical disk.

FIG. 1 is a perspective view of an information recording medium (hereinafter, referred to as optical disk) 1 in the shape of a disk of the present invention. This optical disk 1 has an ink-accepting layer 8 on a front face. FIG. 2 is an expanded sectional view of the above described optical disk 1. The optical disk 1 is constituted by sequentially laminating a concavo-convex information (pit) 3, a recording layer 4, a reflective layer 5, a protective layer 6, a second printing layer 7, and an ink-accepting layer 8 on a transparent substrate 2 made of synthetic resin such as polycarbonate.

Although the above described second printing layer 7 is formed using UV DVC-616 white (manufactured by Teikoku Printing Inks Mfg. Co., Ltd.), in addition, inks for UV curing type screen-printing for optical recording media including not less than 10% of titanium oxide may be used. And, inks which have ink acceptance also in themselves may by used as this white ink.

The ink for printing of the second white printing layer 7 was printed on a UV resin topcoat layer as the above described protective layer 6 to give an applied thickness of 8 micrometers using a polyester screen having 350 mesh/inch, 31 micrometers of yarn diameter, and openings of 38 micrometers, subsequently ultraviolet radiation of 300 mJ/square cm was irradiated using a metal halide lamp, and a printed surface was cured to form the second white printing layer 7. In formation of the above described ink-accepting layer 8.

A. Urethane acrylate: 5 to 15
B. Water-soluble monomer: 70 to 80
C. Water-soluble monomer soluble resin: 5 to 15
D. Photopolymerization initiator: 5 to 15
E. Dyestuff fixing agent: 5 to 15
F. Silica: <5 were milled to prepare an ink for printing (unit; percent by weight).

And this prepared ink was printed on the above described second white printing layer 7 so that an applied thickness of 12 micrometers might be given, using a Tetoron screen having 300 mesh/inch, 35 micrometers of yarn diameter, and openings of 50 micrometers, subsequently ultraviolet radiation of 350 mJ/square cm was irradiated using a metal halide lamp, and a printed surface was cured to form an ink-accepting layer 8.

A glossiness of a front face of this ink-accepting layer 8 was measured under 60-degree glossiness value conditions using the optical characteristic test method of plastics in JIS-K 7105 to give a glossiness value of 53 degrees.

When an ink-accepting layer 8 was formed, silica was included in the ink-accepting layer, and a value of glossiness of the ink-accepting layer 8 was changed by varying a content as seven levels; 2 degrees, 20 degrees, 36 degrees, 45 degrees, 53 degrees, 60 degrees, and 78 degrees. An identification test was performed by ten visual testers, and a rate of the number of visual testers who recognized glossiness was obtained. Results are shown in following Table 1.

TABLE 1

| Glossiness (degree) | Rate of tester recognizing glossiness (%) |
|---|---|
| 2 | 0 |
| 20 | 0 |
| 36 | 50 |
| 45 | 70 |
| 53 | 80 |
| 60 | 100 |
| 78 | 100 |

As is clear in Table 1, in glossiness value of the ink-accepting layer 8 of 2 degrees and 20 degrees, a rate of visual testers who recognized glossiness was 0%. In glossiness value of the ink-accepting layer 8 of 36 degrees, a rate of visual testers who recognized glossiness was 50%, in glossiness value of the ink-accepting layer 8 of 45 degrees, a rate of visual testers who recognized glossiness was 70%, in glossiness value of the ink-accepting layer 8 of 53 degrees, a rate of visual testers who recognized glossiness was 80%, in glossiness value of the ink-accepting layer 8 of 60 degrees and 78 degrees, a rate of visual testers who recognized glossiness was 100%.

From the above result, it became clear that an ink-accepting layer 8 currently formed on the optical disk was made to have high glossiness, and that a high-gloss printing ink-accepting layer 8 similar to print image quality of a print image on photographic paper was securable by controlling a glossiness of the ink-accepting layer 8 to not less than 40 degrees, and preferably not less than 50 degrees.

A gradation pattern form with gradually varying printing shade was printed onto the obtained high-gloss printing ink-accepting layer 8 using an ink jet printer (maker name: SEIKO EPSON CORPORATION, trade name: PM-900C), and a high-gloss printing ink-accepting layer 8 by this embodiment having 40 degrees of glossiness values was visually compared with a conventional available level of an article having an ink-accepting layer 8 of 2 to 20 degrees of glossiness values. Consequently, also an advantage of quality of image printed on the high-gloss printing ink-accepting layer 8 by this embodiment was confirmed in ink-jet printer printing quality of the image.

In addition, although urethane acrylate that is a UV curable oligomer was used here as a component of the ink for the ink-accepting layer 8, use of UV curable oligomer of another type, such as epoxy acrylate and polyester acrylate, may also be possible. In addition to them, components having a function maintaining adhesive strength with the above described protective layer 6 or the second white printing layer 7, such as a UV curable monomer and resin may be usable.

Among water-soluble monomers used as a UV curable monomer as a diluent for UV ink are butadiene diol mono acrylate, 2-hydroxyethyl acrylate, N,N-diethylamino ethyl methacrylate, N,N-diethylamino ethyl acrylate, N,N-dimethyl acrylamide, methoxy methyl acrylamide, ethoxy methyl acrylamide, propoxy methyl acrylamide, butoxy methyl acrylamide, acrylyl morpholine, methoxy polyethylene glycol acrylate, 2(2-ethoxy ethoxy)ethyl acrylate, 2-hydroxyethyl vinyl ether, etc. One kind of the water-soluble monomer may be used separately, or two or more of them may be used in combination.

Moreover, among water-soluble monomer soluble resins used in order to increase ink absorbing power of the ink for ink jet recordings are polyvinyl pyrrolidone, alkyl (meth) acrylate (co)polymers, vinyl chloride vinyl acetate copolymers, polyesters, cellulose acetates, cellulose propiols, cellulose acetate butylates, cellulose nitrates, hydroxyethyl celluloses, hydroxypropyl celluloses, hydroxypropyl methyl cellulose phthalates, hydroxypropyl methyl celluloses, cellulose acetate succinates, ethyl celluloses, butyral resins, etc. One kind of the water-soluble monomer soluble resins may be used separately, or two or more of them may be used in combination.

Moreover, among photopolymerization initiators for starting polymerization by ultraviolet radiation are benzoin ethyl ether, 2-hydroxy-2-methyl-1-phenyl propane-1-on, 1-hydroxy cyclohexyl phenylketone, 2-methyl-1-[4-(methylthio)phenyl]-2-morpholino propanone-1, bisacyl phosphine oxide, etc. One kind of the photopolymerization initiators may be used separately, or two or more of them may be used in combination.

Furthermore, as illustrative examples of dyestuff fixing agents used in order to decrease bleeding of printed image and stickiness of printing section; Polyfix 700, Polyfix 601, Polyfix IJ-1000S (by SHOWA HIGHPOLYMER CO., LTD.); Super resist NP, SENKAFIX 157, SENKAFIX 300, SENKAFIX 401, SENKAFIX JOY-2, SENKAFIX JOY-8N, SENKAFIX NFC, SUPRAFIX DFC, CHERCUT CF-2, SILKFIX 3A, HI-16A, HP-142A, HP-144A, HP-146A, HP-149A, HP-151A (by SENKA CORPORATION); Sanfix 70, Sanfix 414, Sanfix PRO-100, Sanfix PAC-700 conc (by Sanyo Chemical Industries, Ltd.); Mohrin fix 3PN, Mohrin fix 6P, and Mohrin fix 300B (by Mohrin Chemical Industry, Ltd.); IJC-002, IJC-009 (by NICCA Chemical Co., Ltd.); Kayafix M (by NIPPON KAYAKU CO., LTD.) etc. may be mentioned. One kind of the dyestuff fixing agents may be used separately, or two or more of them may be used in combination.

Moreover, as for silica, it is preferable that fine-grains silica having a grain diameter of less than 0.1 micrometer is used in less than 5 parts by weight so that it may give enough transparency not to decrease the whiteness of the second white printing layer 7, and so that the glossiness may not be decreased.

An ink for printing the ink-accepting layer 8 is constituted by UV curable oligomer and/or UV curable monomer, and photopolymerization initiator as essential components, and in addition water-soluble monomer soluble resins, leveling agents, plasticizers, antioxidants, defoaming agent, surface tension regulators, etc. may be included as an additive for attaining stabilization of the ink etc.

Samples in which glossiness values of the above described ink-accepting layer 8 were prepared and seven levels of 2 degrees, 20 degrees, 36 degrees, 45 degrees, 53 degrees, 60 degrees, and 78 degrees were measured for a surface roughness Ra (arithmetic mean relative roughness) of the ink-accepting layers 8, and results are shown in FIG.

Figure 3:
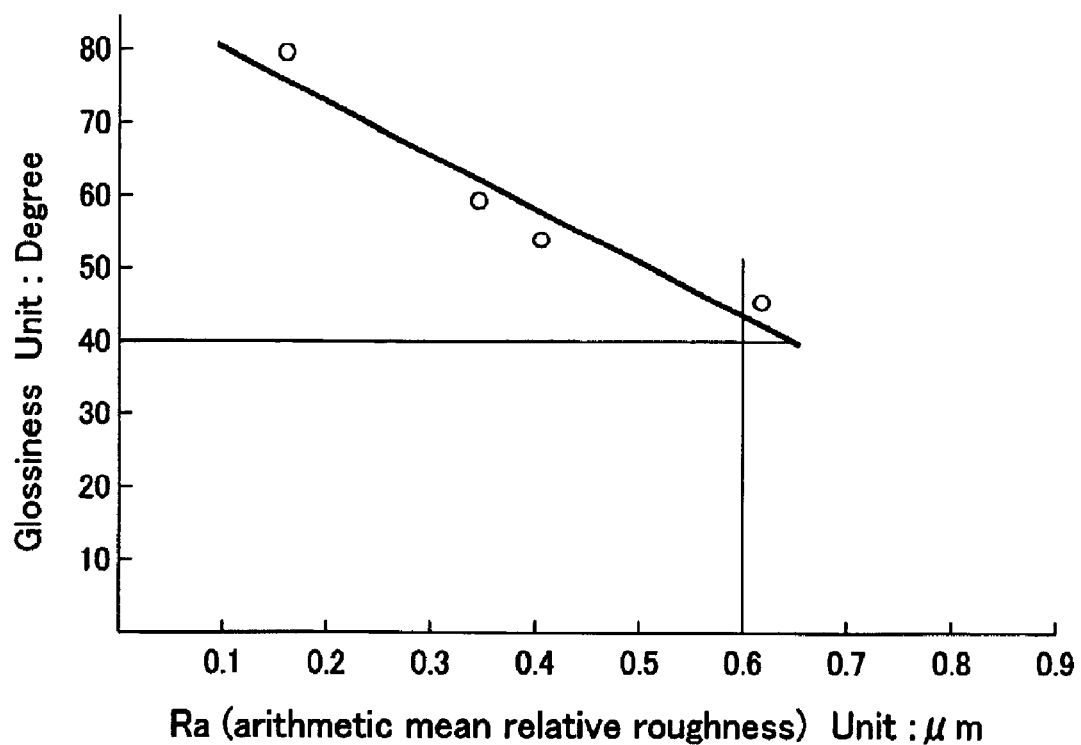
FIG. 3 is a graph showing measurement results of surface roughness Ra in each glossiness value of ink-accepting layers (arithmetic mean relative roughness)

3. FIG. 3 is represented by letting X coordinate be surface roughness Ra (arithmetic mean relative roughness), and glossiness of ink-accepting layer 8 be Y coordinate. Measurement of surface roughness Ra (arithmetic mean relative roughness) of an ink-accepting layer 8 was performed by a Surfcom 550A (trade name) of Tokyo-Seimitsu.

Surface roughness Ra (arithmetic mean relative roughness) of an ink-accepting layer 8 and glossiness of the ink-accepting layer 8 have a clear linear relationship between them, as is apparent in FIG. 3, scattered reflection of an ink-accepting layer 8 will be suppressed, and not less than 40 degrees of glossiness of the above described ink-accepting layer 8 may be obtained by controlling a surface roughness Ra (arithmetic mean relative roughness) of the ink-accepting layer 8 to not more than 0.6 micrometer.

In the above described ink-accepting layer 8, although lightness (L) of the second white printing layer 7 which serves as a lower layer having a glossiness value of the ink-accepting layer 8 to 45 degrees showed 91 degrees, a result of comparison by viewing of a feeling of glossiness of a second white printing layer 7 set as lightness of 87 degrees, and a feeling of glossiness of a second white printing layer 7 having lightness of 91 degrees raised a problem that glossiness which was reduced in appearance in the second white printing layer 7 having lightness of 87 degrees was observed.

Figure 4:
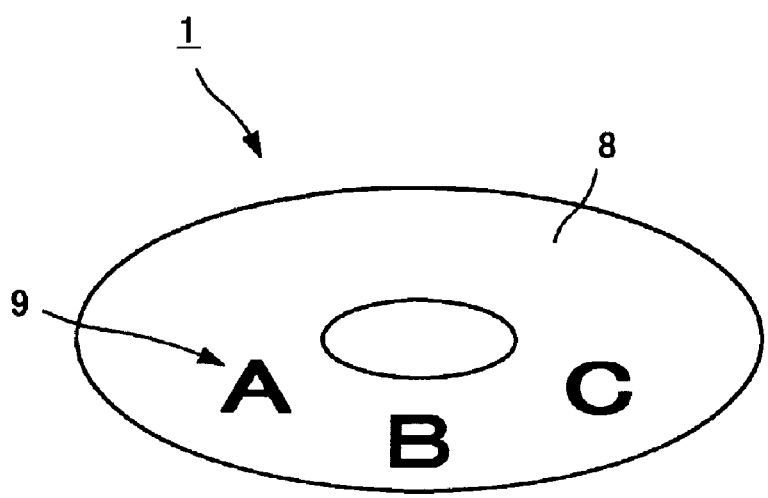
FIG. 4 is a perspective view showing an optical disk in which capacity, maker name, and other character and pattern are printed on an upper layer of an ink-accepting layer.

In addition, as shown in FIG. 4, a kind of optical disk, capacity, maker name, and other character and pattern 9 may be printed by the maker on the top of an ink-accepting layer 8.

An ink that forms an ink-accepting layer of a second embodiment of the present invention was prepared by milling a mixture having a following composition (unit: percent by weight).

A. Polyvinyl acetal resin: 5 to 15
B. Water: 50 to 60
C. Isopropyl alcohol: 30 to 40
D. Dyestuff fixing agent: <5
E. Silica: <5

And on the above described second white printing layer, the prepared ink was applied by flow coating so that an application thickness after drying is 10 micrometers, and subsequently, dried for 2 minutes by 60° C. warm air, and an ink-accepting layer 8 was formed.

A glossiness of a front face of this ink-accepting layer was measured under 60-degree glossiness value conditions using the optical characteristic test method of plastics in JIS-K 7105 to give a glossiness value of 70 degrees.

Except that a composition and a formation method of an ink-accepting layer 8 of the first embodiment were changed as described above, the same operation as the first embodiment was repeated to obtain same results as in Table 1 and in FIG. 3.

In addition, although polyvinyl acetal resin was used as a component of the ink of an ink-accepting layer 8, the resin does not need to be limited to this and various kinds of hydrophilic resins having wettability to water may be used. As examples the above described water-soluble monomer soluble resin etc. besides hydrophilic resins, such as polyvinyl butyrals, polyvinyl pyrrolidone, cellulose based resins, acrylic emulsions, and polyester emulsions may be mentioned. One kind of the resins may be used separately, or two or more of them may be used in combination.

In a third embodiment of the present invention, a constitution in which powder of scale-like piece, i.e., flake-like (shape of board) piece was dispersed and included in an ink forming a second printing layer 7 under an ink-accepting layer 8. Thereby when this second white printing layer 7 is printed by a method, such as screen- printing, on a protective layer 6, ink is extruded by a squeegee from a silk screen and powder of scale-like piece dispersed and included in the ink forced on a front face of the protective layer 6 by pressure of squeegeeing, and thus arranged in a shape of a plate to provide a white printing layer 7 with high lightness.

An ink forming this second white printing layer 7 of the third embodiment was obtained by kneading UV DVC-000 Medium (manufactured by Teikoku Printing Inks Mfg. Co., Ltd.): 75 parts by weight, as base resin, and white mica powder having a diameter of 12 micrometers (aspect ratio 5): 25 parts by weight, as powder of scale-like piece.

This ink prepared for printing for a second white printing layer 7 of the third embodiment was printed so that an applied thickness of 15 micrometers might be given, on a UV resin topcoat layer as the above described protective layer 6, using a Tetoron screen having 250 mesh/inch, 40 micrometers of yarn diameter, and openings of 62 micrometers. Subsequently ultraviolet radiation of 350 mJ/square cm was irradiated using a metal halide lamp, and a printed surface was cured to form a white printing layer 7.

In addition, as a powder of scale-like piece included in an ink for printing for a second white printing layer 7 of the third embodiment of the present invention, besides the white mica powder (aspect ratio 5) having a diameter of 12 micrometers illustrated as example, talc, glass flakes, board-like calcium carbonates, board-like aluminum hydroxides, kaolin, titanium oxides, etc. may be used.

Figure 5:
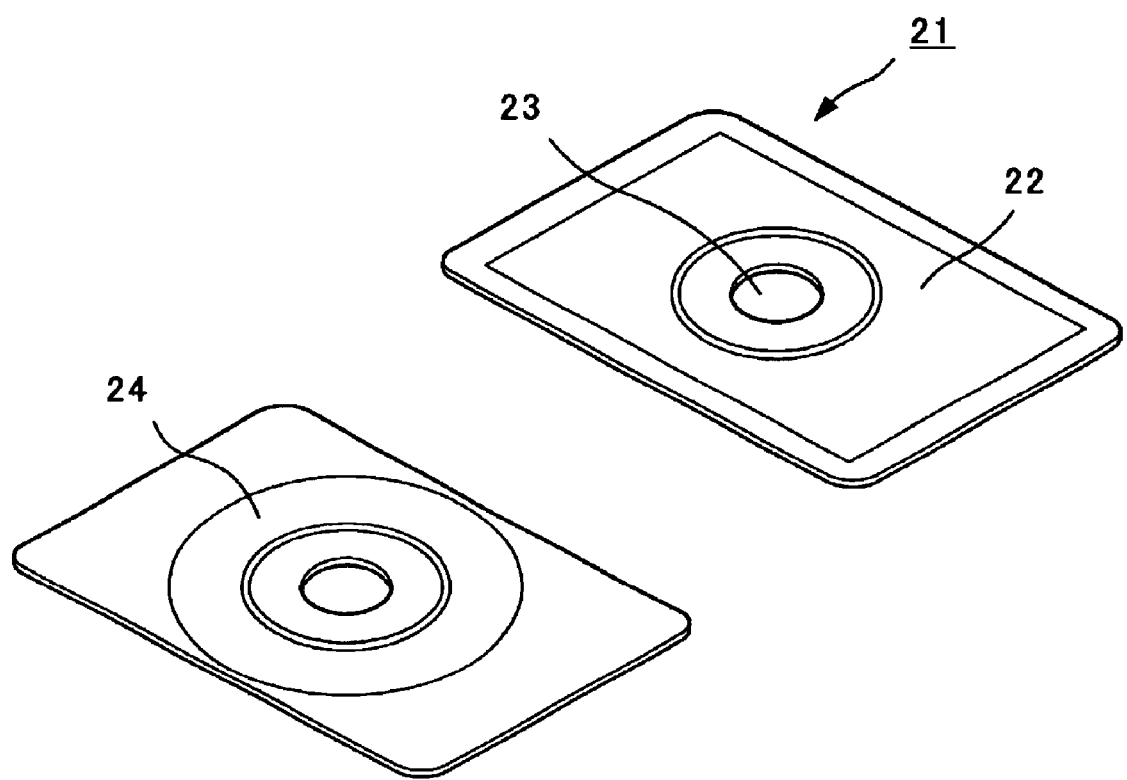
FIG. 5 is a perspective view showing a card type recording medium to which the present invention may be applied.

Moreover, here, a description was given of an ink-accepting layer 8 of optical disks represented by CD-R etc. In addition, a card type recording medium 21 disclosed in International Laid-Open WO 099/00765 in which a hole 23 for actuation is formed in a plate as shown in FIG. 5 also has an ink-accepting layer 22 similarly formed on a back face of an incident side 24 of light for playback/record on a transparent substrate. Also in this field, it becomes possible to supply a card-like recording medium with high commercial value.

In an optical information medium in which an information recording layer is formed on a disk-like transparent substrate, and information optically readable with laser light may be played back and/or recorded, surface glossiness of an ink-accepting layer having ink acceptability that is coated onto a back face of incident side of light for playback/record of the above described transparent substrate is set to not less than 40 degrees, and thereby high-gloss is given to the ink-accepting layer currently formed on an optical disk to secure a high-gloss printing ink-accepting layer similar to print image quality of photographic paper. In this way, a high quality of image may be obtained in a gradation pattern form with a gradually varying printing shade produced by an ink jet printer, and as a result advantage will be secured as compared with conventional available level of articles, and attractiveness to consumers can be increased.

Surface roughness Ra (arithmetic mean relative roughness) of a high-gloss printing ink-accepting layer is controlled to be set to not more than 0.6 micrometer, and thereby scattered reflection of the high-gloss printing ink-accepting layer is suppressed to enable glossiness of the ink-accepting layer to be not less than 40 degrees.

A white printing layer having lightness of not less than 90 degrees is prepared under a high-gloss printing ink-accepting layer, and thereby high glossiness in appearance is maintained as compared with the white printing layer 7 having low lightness to provide a stable and high-gloss printing ink-accepting layer.

When the lower layer is printed by a method, such as silk printing, on a protective layer on a lower layer of a high-gloss printing ink-accepting layer, using an ink in which powder of scale-like particles are dispersed and included, the ink is extruded by a squeegee from the silk screen and powder of scale-like pieces is dispersed and included in the ink and is forced on a front face of the protective layer 6 by pressure of squeegeeing, and thus arranged in a shape of a plate to obtain a ground printing layer having high lightness and high flatness.

Printing is performed on a high-gloss printing ink-accepting layer by an ink containing a UV curable monomer and/or UV curable oligomer, thereby curing is performed in a short time, when the high-gloss printing ink-accepting layer is printed onto an optical disk and cured, and furthermore generation of VOC in curing time may also be suppressed to enable alleviation of effect on the earth environment.

An ink absorbing power of an ink for ink jet recordings may be increased by applying and drying an ink including hydrophilic resins and cost may be reduced as compared with inks including a UV curable oligomer and/or UV curable monomer.

A little amount of silica having a grain diameter of less than 0.1 micrometer is included in an ink that forms a high-gloss printing ink-accepting layer, thereby a thixotropic property is given to the ink for the ink-accepting layer to improve printability in screen-stencil, and thus a stable ink-accepting layer may be formed, and furthermore absorbing power of the ink jet recording ink improves, and an effect of suppression of bleeding of the printed image or stickiness of the printing section may be obtained by inclusion of a dyestuff fixing agent.

What is claimed is:

1. An optical information medium in which an information recording layer is formed on a transparent substrate, and information optically readable with laser light is played back and/or recorded, comprising:

an ink-accepting layer having ink acceptability coated onto a back face of an incident side of light for playback/record of the transparent substrate having a surface glossiness not less than 40 degrees; and an average surface roughness (Ra) of the ink-accepting layer smaller than 0.6 micrometer.

2. An optical information medium in which an information recording layer is formed on a transparent substrate, and information optically readable with laser light is played back and/or recorded, comprising:

an ink-accepting layer having ink acceptability coated onto a back face of an incident side of light for playback/record of the transparent substrate having a surface glossiness not less than 40 degrees; and a white printing layer having 90 degrees or more lightness formed under the ink-accepting layer.

3. The optical information medium according to claim 1, wherein a printing layer is formed under the ink-accepting layer by an ink in which powder of scale-like particles are dispersed and included.

4. The optical information medium according to claim 2, wherein the white printing layer is formed under the ink-accepting layer by an ink in which powder of scale-like particles are dispersed and included.

5. The optical information medium according to any one of claims 1, 2, 3 and 4, wherein the ink-accepting layer is formed by curing of an ink including UV curable monomer and/or UV curable oligomer.

6. The optical information medium according to any one of claims 1, 2, 3 and 4, wherein the ink-accepting layer is formed by an ink with a hydrophilic resin dissolved in solvent being dried.

7. The optical information medium according to claim 5, wherein the ink-accepting layer includes silica having a grain diameter of less than 0.1 micrometer and/or a dyestuff fixing agent.

8. The optical information medium according to claim 6, wherein the ink-accepting layer includes silica having a grain diameter of less than 0.1 micrometer and/or a dyestuff fixing agent.

9. An optical information medium in which an information recording layer is formed on a transparent substrate, and information optically readable with laser light is played back and/or recorded, comprising:

an ink-accepting layer having ink acceptability coated onto a back face of an incident side of light for playback/record of the transparent substrate having a surface glossiness not less than 40 degrees;

a white printing layer formed under the ink-accepting layer by an ink in which powder of scale-like particles are dispersed and included; and the ink-accepting layer being formed by an ink with a hydrophilic resin dissolved in solvent being dried.

* * * * *